May 1, 1962 W. G. BROSENE, JR., ETAL 3,032,095
TIRE DEMOUNTING APPARATUS
Filed Jan. 30, 1959 4 Sheets-Sheet 1
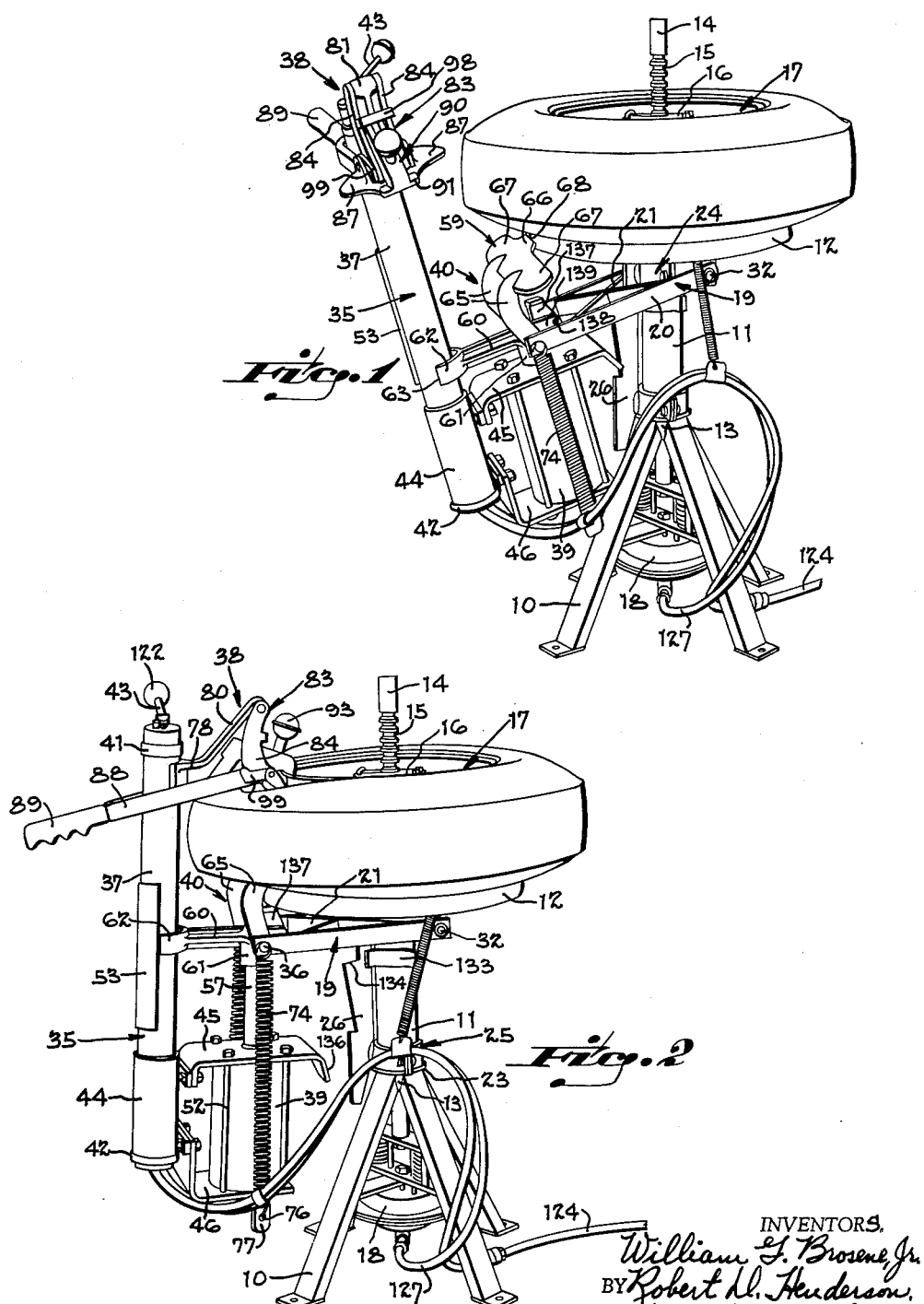
INVENTORS.
William F. Brosene, Jr.
BY Robert W. Henderson.
Wood, Herron & Evans.
ATTORNEYS.

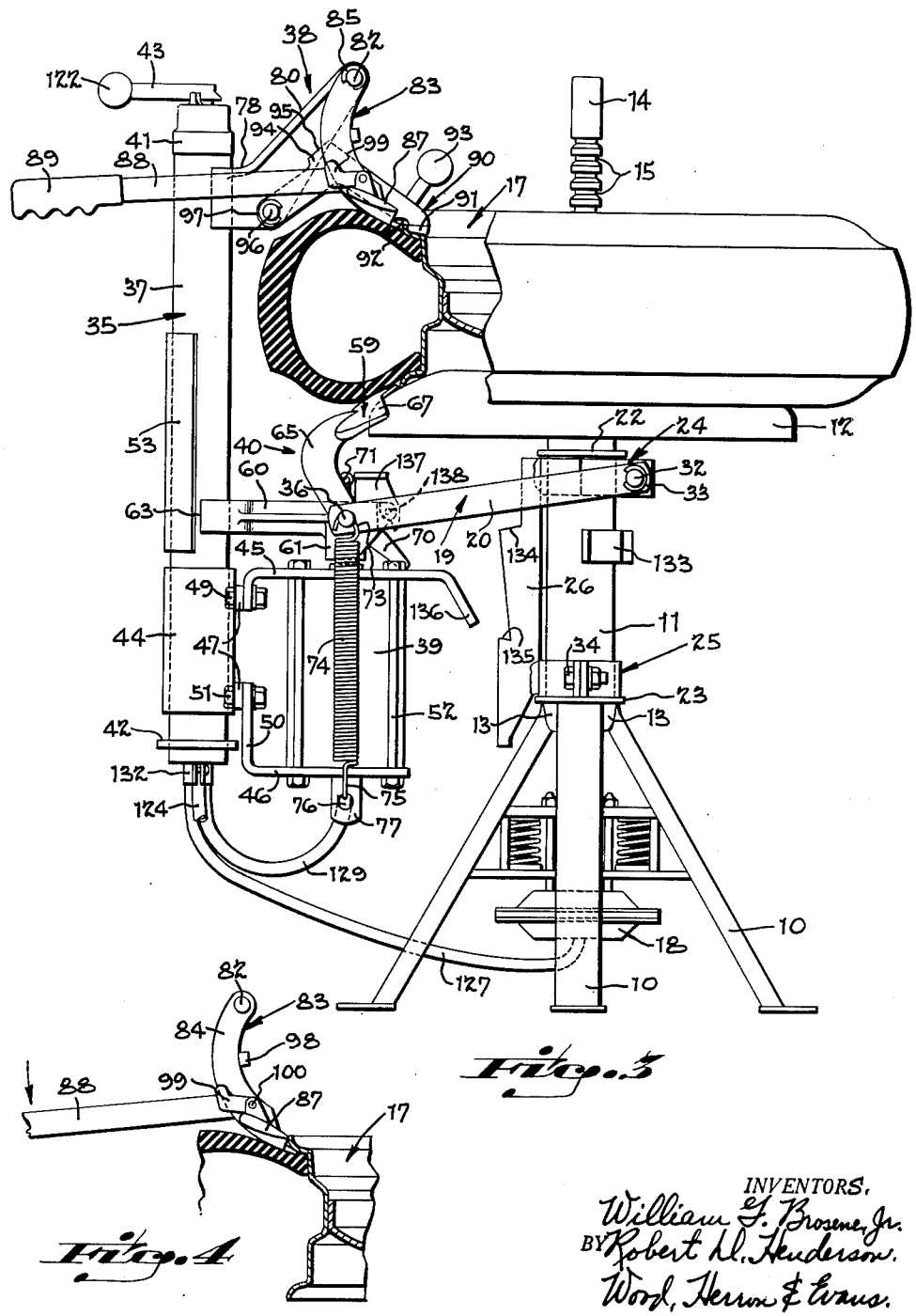

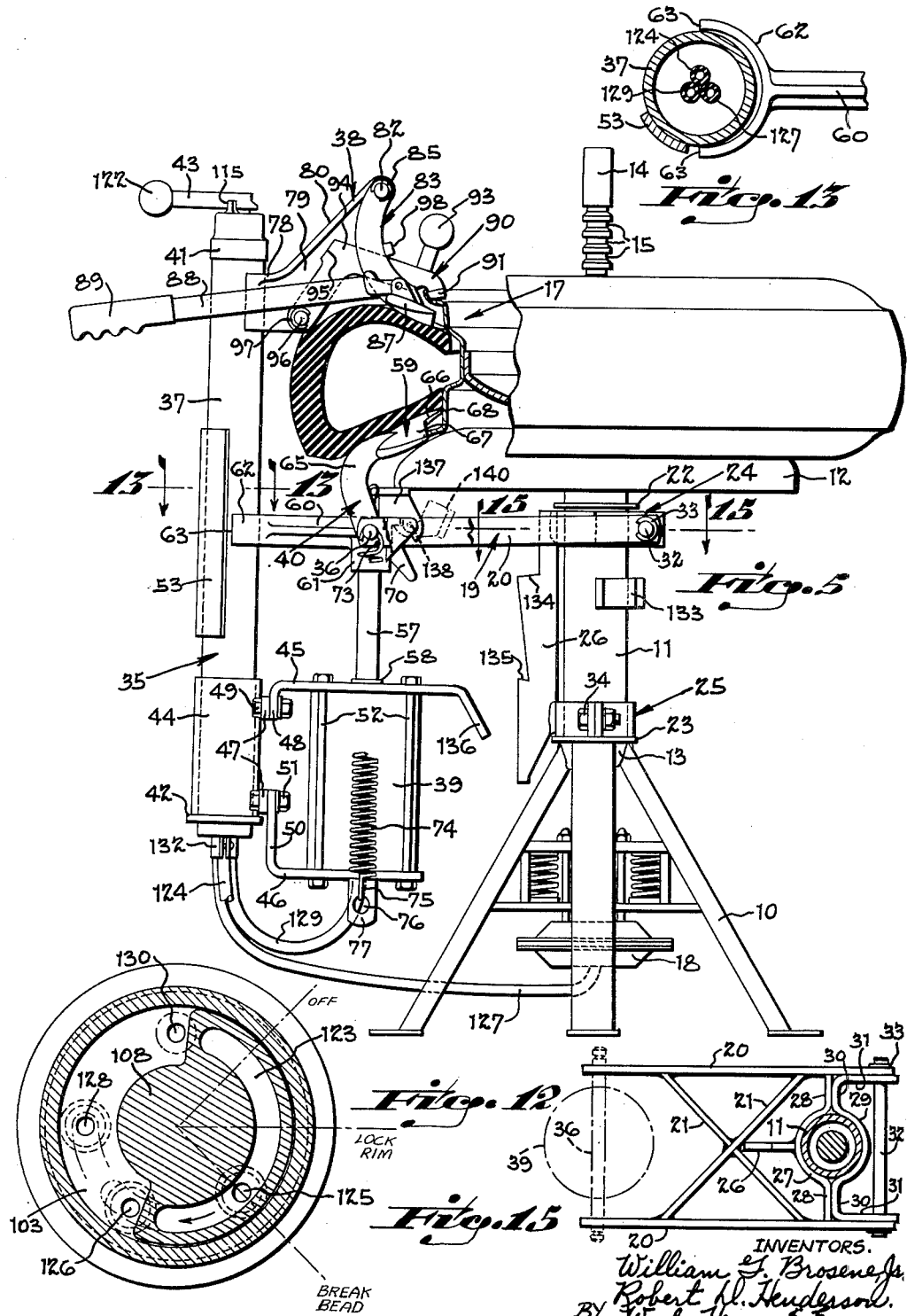

May 1, 1962 W. G. BROSENE, JR., ETAL 3,032,095
TIRE DEMOUNTING APPARATUS
Filed Jan. 30, 1959 4 Sheets-Sheet 4
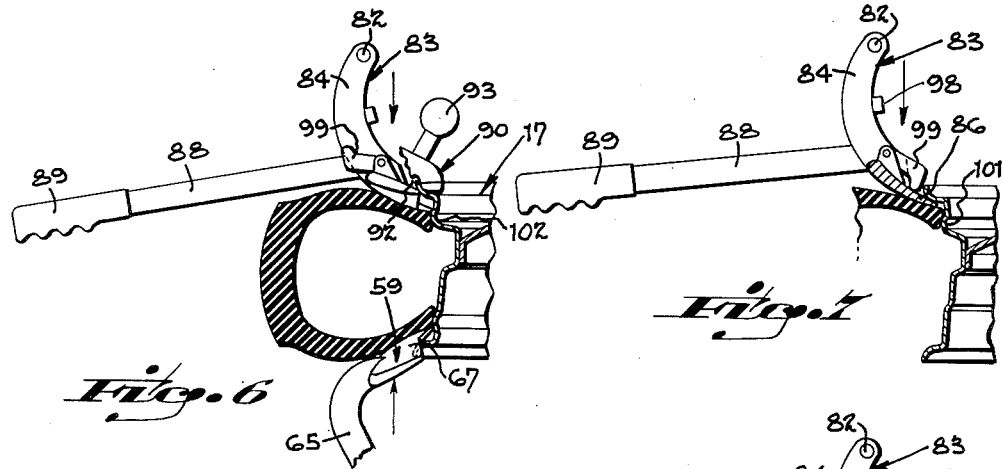
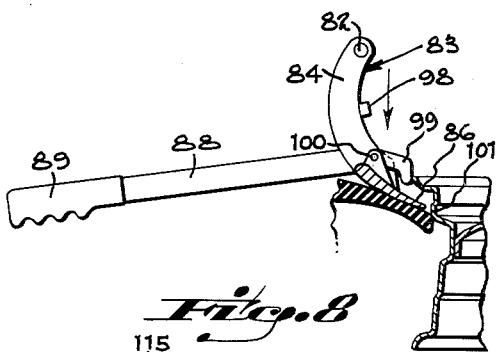
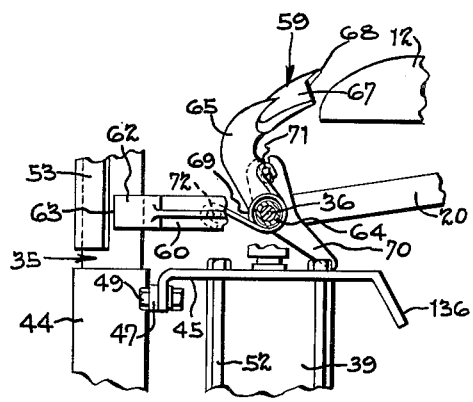
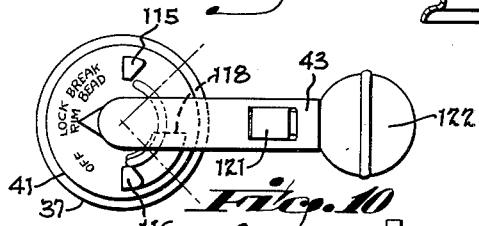
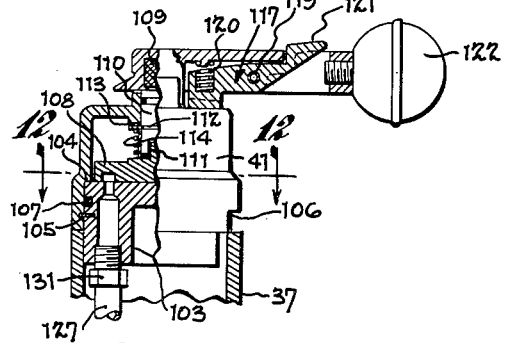
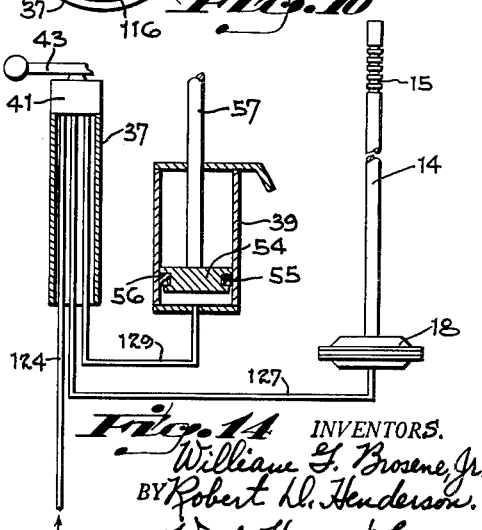
INVENTORS.
William G. Brosene, Jr.
BY Robert D. Henderson.
Wood, Herron & Evans.
ATTORNEYS.

United States Patent Office 3,032,095
Patented May 1, 1962

3,032,095
TIRE DEMOUNTING APPARATUS
William G. Brosene, Jr., Wyoming, and Robert D. Henderson, Cincinnati, Ohio; Richard L. Henderson, administrator of said Robert D. Henderson, deceased; said Brosene assignor to Big Four Industries, Inc., Cincinnati, Ohio, a corporation of Ohio
Filed Jan. 30, 1959, Ser. No. 790,117
10 Claims. (Cl. 157—1.28)

This invention relates to tire changing machines of the type best exemplified by the patent to Robert D. Henderson No. 2,609,039, dated September 2, 1952. The machine of that patent comprises essentially a stand including a table upon which a wheel having a tire to be demounted is placed, a clamping device to securely hold the wheel in place on the table while the tire is being operated upon, and hand operated bead breaking jaws which function initially to disengage or break the beads of the tire from the rim of the wheel and then force or pry the beads into the drop center of the wheel. Tools are also provided to be used with the machine for completely removing the tire from the wheel and for replacing the tire upon the wheel.

The present invention is concerned primarily with the bead breaking operation of a machine of this type, this operation including the initial break and the forcing of the beads into the drop center of the wheel. The bead breaking jaws or shoes of the machine of Henderson Patent No. 2,609,039, which are the components of the machine which do the actual breaking, operate upon the principle of utilizing the contour of the wheel as a guide, each bead breaking jaw, first, moving into the juncture between the bead of the tire and the rim of the wheel, second, moving into contact with the wheel underneath the bead, and, third, while forcing or prying the bead of the tire into the drop center, riding on the surface of the wheel inside of the rim in toward the drop center well.

This principle of operation is utilized in the tire demounting apparatus of the present invention. However, the apparatus of this invention incorporates power means to operate the jaws or shoes. In the Henderson patent to which reference has been made, the bead breaking jaws are carried upon levers and these levers are operated by hand to effect the initial break and then to force the bead of the tire into the drop center of the wheel. It is well known that a tire which has been used for a long period becomes literally welded to the wheel upon which it is mounted, requiring a considerable amount of force to make the initial break between the bead and the wheel. Additionally, the problem of breaking a bead of a tire and then pushing it into the drop center of a wheel has become more difficult with the advent of tubeless tires, the trend toward smaller wheel sizes, and particularly the use of safety rims, these rims incorporating shoulders or "humps" which extend around the inside of the wheel immediately to the inside of the bead of a tire upon the wheel. In order to completely break a tire mounted on one of these safety rim wheels it is not only necessary to overcome the initial weld between the tire and the wheel, but it is also necessary to lift the bead over the shoulder and then to push it past the shoulder into the drop center. All of these things have made the demounting of tires more and more difficult and all have necessitated the application of a greater amount of force to the bead breaking jaws in order for them to perform their intended functions.

It may be seen therefore that the principal objective of the invention has been to provide a tire changing machine in which the bead breaking jaws or shoes are powered, thereby making the task of changing difficult tires less strenuous upon the operator.

Other objectives, advantages and features of the invention will be readily apparent to those skilled in the art from the following detailed description of the drawings in which:

FIGURE 1 is a perspective view of a tire changing machine incorporating the principles of the present invention, a wheel with a tire thereon being shown clamped to the table of the machine.

FIGURE 2 is a view similar to FIGURE 1 showing the parts of the bead breaking apparatus in the positions they assume at the time the bead of a tire is being broken.

FIGURE 3 is a side elevational view of the machine showing the parts of the bead breaking apparatus in the positions they assume at the start of a bead breaking operation, certain parts of the view being broken away for illustration purposes.

FIGURE 4 is a fragmentary cross sectional view illustrating the upper bead breaker only in the position it assumes as it enters the juncture between the rim and the bead of a tire mounted upon the wheel.

FIGURE 5 is a side elevational view similar to FIGURE 4 showing the parts of the bead breaking apparatus in the positions which they assume as the beads of the tire are being pushed into the drop center of the wheel.

FIGURE 6 is a fragmentary cross sectional view showing the upper and lower bead breakers in the positions which they assume just after the initial break is made between the beads and the rim of the wheel.

FIGURE 7 is a fragmentary cross sectional view of the upper bead breaker only, showing the upper bead breaker entering the juncture between the bead and the wheel rim, and illustrating the way in which the lifting pawls carried by the upper bead breaker function to lift the tire bead and the bead breaker itself over the "square hump" used for certain safety rims.

FIGURE 8 is a view similar to FIGURE 7 showing the upper bead breaker in the position it assumes as the bead is being lifted over the hump.

FIGURE 9 is a fragmentary side elevational view of the lower bead breaker only illustrating the means which are employed to retract the lower bead breaker away from the side of the tire changer table.

FIGURE 10 is a top plan view of the valve which controls the application of air pressure to the power breaker apparatus of the machine.

FIGURE 11 is a fragmentary cross sectional view of the valve illustrated in FIGURE 10.

FIGURE 12 is an enlarged cross sectional view taken on the line 12—12 of FIGURE 11.

FIGURE 13 is a fragmentary cross sectional view taken on the line 13—13 of FIGURE 5.

FIGURE 14 is a diagrammatic view illustrating the components of the pneumatic system employed in the machine.

FIGURE 15 is a fragmentary cross sectional view taken on the line 15—15 of FIGURE 5.

The basic stand of the machine is similar to the disclosure of U.S. Patent No. 2,808,860. However, the parts are more rugged in this case to accommodate the power operated bead breaking mechanism of this invention. Essentially, the stand includes four legs, each of which is designated 10, a pedestal 11 and a circular table 12. The legs are spread as shown and their upper ends are welded, indicated at 13, to the lower end of the pedestal 11. The lower ends of the legs are flanged and holes are provided in them for bolting the machine to the floor. The pedestal 11, as shown in Patent No. 2,808,860, comprises a cylinder or tube which mounts bearings in its upper and lower ends to slidably journal a center post 14, which post projects up through an opening in the center of table 12. Above the table the center post has a series of circular ratchet grooves 15 in it which cooperate with a clamp 16 to securely hold a wheel, such as the one designated generally by the numeral 17, in a centered position upon table 12. Center post 14 preferably is shiftable in the vertical direction by means of a power cylinder 18 which is shown at the bottom of the stand being surrounded by legs 10. The details of construction of the power cylinder, the center post and the clamp 16 are illustrated in Patent No. 2,808,860 and it is believed unnecessary to further describe them other than to state that the parts are made somewhat heavier in the present machine and, for reasons to be explained, the diameter of the power cylinder 18 preferably is somewhat larger than the power cylinder shown in Patent No. 2,808,860 so as to exert a greater downward clamp force upon a wheel on table 12.

The only other difference of any significance between the stand shown here and the one of the patent is that the pedestal 11 is somewhat longer in the present instance to accommodate the means, including a yoke, indicated generally at 19, which mounts the power breaker apparatus. The construction of the yoke 19 may best be understood from the illustration of FIGURE 15, and it comprises two arms 20—20 which are disposed in spaced parallel relation and which are joined by a pair of crossed truss members 21—21. As shown, the truss members are welded to the arms and to each other and they cross near the center of the yoke to leave substantially large free areas between the arms at the opposite ends of the yoke. Pedestal 11 mounts two collars, an upper collar 22 and a lower collar 23, these collars being at the respective upper and lower ends of the pedestal and being fixed in place as by welding. The pedestal also mounts two split bearings adjacent to the collars, the upper bearing being designated generally 24 and the lower bearing being designated generally 25. As shown, the lower split bearing 25 rests upon collar 23, whereas the upper collar 22 prevents upward movement of the upper split bearing 24. These two bearings are fastened to one another in the spaced relationship shown by means of a stop plate 26, the stop plate being welded to bearings 24 and 25 and extending generally vertically and radially with respect to the center of the pedestal 11 at the side thereof toward the power column. Upper split bearing 24 is made in two parts. One of these parts, at the side of the pedestal toward the power column, consists of a semi-circular portion 27 having substantially radial flanges 28—28 at its opposite ends. The other part of split bearing 24 consists of a semi-circular portion 29, which matches semi-circular portion 27 of the other part of this bearing, flanges 30—30 which match flanges 28—28, and two arms 31—31 which turn at right angles to flanges 29—29 at the ends thereof opposite the power column. The flanges 28—28 and 30—30 are secured together as by welding. The outer ends of the arms 31—31 and the outer ends of yoke arms 20—20 (these ends being opposite to the power column) are drilled to receive a pivot pin 32, which pin projects through the respective arms, being grooved just to the outside of the outer faces of yoke arms 20—20 to receive snap rings 33—33 which hold the pin in place. It may be seen therefore that the yoke arm is thus pivotally mounted upon pin 32 for up and down swinging movement and is also rotatably mounted upon pedestal 11 for rotative movement about the vertical axis of the table 12.

The lower split bearing is made in two parts as in the case of the upper split bearing and includes complementary parts except that the arms 31—31 are not required. In this instance, flanges at the opposite sides of the bearing are secured together by bolts 34.

The power breaker assembly, which is indicated generally by the numeral 35, is pivotally mounted at the outer end of yoke 19 by means of a pivot pin 36. Pin 36 passes through appropriate bores in arms 20—20 at the end of the yoke opposite pivot pin 32 such that the power breaker assembly, as a unit, is adapted to swing up and down, within limits as will be described, about the axis of the pivot pin 32, and is also adapted to pivot about pin 36 at the outer end of the yoke. The articulated mount thus provided by the two pivot pins results in a floating action for the power breaker assembly; for, as will be seen, the assembly is not only initially adjustable to position it relative to a wheel upon table 12 (this to accommodate different types and sizes of wheels), but thereafter, when power is applied to the assembly the floating action permits it to automatically seek positions relative to a wheel upon the table which most advantageously present the bead breaking shoes carried by the assembly to the wheel.

In general, the power breaker assembly comprises a column 37, upper bead breaker assembly 38, which is affixed to the upper end of column 37, power cylinder 39, and lower bead breaker assembly 40. Column 37 comprises a length of hollow tubing having a cap 41 enclosing its upper end and a collar 42 affixed to its lower end. The cap encloses valve mechanism operable by means of a handle 43 for controlling the pneumatic system by which the apparatus is powered. The collar 42 at the bottom of column 37 comprises a stop which is functional during a bead breaking operation as will be described below.

The power cylinder 39 is slidably mounted upon column 37 by means of a cylindrical sleeve 44 which surrounds the lower end of the column immediately above collar 42. The power cylinder is attached to the sleeve by means of an upper mount bracket 45 and a lower mount bracket 46. In each instance, the attachment is made through a bar 47 which is rigidly fastened to the side of sleeve 44 by means such as welding, there being two such bars, one being disposed above the other such that they are in spaced parallel relation and arranged tangentially with respect to the cylindrical sleeve. Upper mount bracket 45 is turned over at a right angle to provide a depending flange 48 and this flange is affixed to the upper one of the two bars 47 by means of bolts 49. The lower mount bracket 46 is in this instance turned up to provide a flange 50 which is affixed to the lower cross bar 41 by means of bolts 51 just as in the case of the upper mount bracket 45. As may be seen in FIGURES 1 and 2 the upper and lower mount brackets are plate-like and they mount the cylinder 39 between them providing ends for the cylinder. The cylinder is locked in place between the brackets by means of four tie bolts 52 which are located around the cylinder at equally spaced points and which pass through appropriate bores in the upper and lower mount brackets. As shown, the tie bolts have heads which abut the upper surface of upper mount bracket 45 and they receive nuts at the lower ends which abut the undersurface of lower mount bracket 46.

Sleeve 44 is slidable upon column 37 within limits defined by the upper surface of the collar 42 and the underside of a stop 53. This stop is arcuate in cross section to conform to the column and it extends along one side of the column as may be seen in FIGURE 13, being welded thereto. As will be explained below, the stop 53 is sufficiently wide and of sufficient extent lengthwise so that its two side edges provide stops cooperable with abutments, to be described later, which limit the turning motion of column 37 within sleeve 44 to slightly more than 90 degrees. The purpose of providing this turning movement is to permit the upper bead breaker shoe assembly 38 to be turned to the side and away from the wheel being operated upon when it is desired to utilize the lower bead breaker shoe assembly only of the power breaker assembly.

A piston 54 shown diagrammatically only in FIGURE 14 rides within cylinder 39. Preferably the piston has an annular groove 55 in it which seats a resilient piston ring 56 of the type which tends to expand radially outwardly when air pressure is applied to the cylinder underneath piston 54. The piston ring in this way prevents leakage of air pressure past the piston, but automatically contracts when air pressure is no longer applied to the underside of the piston, which permits the piston to move down readily in the cylinder. A piston rod 57 projects from piston 54 up through an appropriate bushing 58 which is seated in known manner in a bore in upper mount bracket 45. It may be seen therefore that when air pressure is applied to the bottom of power cylinder 39 the piston rod is caused to extend and thereby move up with respect to the power cylinder, and when the air pressure is exhausted from the bottom of the power cylinder the piston rod retracts, moving down.

The lower bead breaker shoe assembly comprises the shoe itself which is indicated generally by the numeral 59, and a guide arm 60. One end of arm 60 comprises an inverted cap portion 61 which receives the upper end of piston rod 57, the arm itself projects from the cap portion at right angles to the piston rod 57 and its outer end is configured to provide a semi-circular column engaging guide 62 which loosely embraces the column. The arcuate guide 62 embraces one-half of the column 37 and its outer ends provide the two abutments, now identified at 63—63, which cooperate with the sides of the limit stop 53 to limit the turning movement of the column 37 in sleeve 44 to slightly more than 90 degrees. The pivot pin 36 which is carried by the outer ends of the arms 20—20 of yoke 19 passes through the cap portion 61 of the guide arm 60. A tubular bushing 64 surrounds the pivot pin 36, the bushing being long enough to extend from the inner surface of one of the yoke arms 20 to the inner surface of the opposite yoke arm 20. Hence, the guide arm 60 pivots on the bushing, the bushing passing through its cap portion 61. The lower bead breaking shoe 59 includes two arms 65—65 which arms are disposed in spaced parallel relation to straddle the cap portion of guide arm 60. Bores in the lower ends of the arms receive the bushing 64 so that the shoe is pivoted upon the bushing for swinging movement about the axis of the pin 36. As may be seen in FIGURE 1 the shoe includes a wedge portion 66 and two wing portions 67—67. The shoe terminates in a tapered leading edge which is comparatively thin, although rounded so as to not cut into the bead of a tire. The leading edge is designated 68 in the drawings and it projects outwardly beyond the leading edges of the two wing portions 67—67. Additionally, it is preferred that the whole shoe contour including the two wings 67—67 and the projecting wedge be configured so that they follow an arc which places the two wings slightly below the wedge. This relationship is shown in FIGURE 5, and it has the effect, during a bead breaking operation, of the wings following the leading edge of the wedge 66 so that it is the wedge which makes the initial break and then after the initial break has been made it is the wedge which tracks upon the inner contour of the wheel ahead of the leading edges of the wings. The wings, themselves, during a breaking operation support additional portions of the bead and the tire side wall at the sides of the wedge and assist the bead breaking operation, spreading the breaking force of the shoe over a larger area of the tire bead. A coil spring 69, having a number of turns around the bushing 64 between the two arms 65—65 of the lower bead breaking shoe, is employed to urge the shoe in a clockwise direction as viewed in FIGURE 1 which forces the leading edge of the shoe in toward the table 12 and thus in toward the juncture of a tire bead and the rim of the wheel carrying the tire. One of the arms 65 of the shoe, the left one as viewed in FIGURE 1, preferably is extended beyond the bushing 64 to provide a bell crank lever 70 which terminates in a rounded lower end. This lower rounded end of the bell crank lever 71 is positioned to come into contact with the upper surface of the upper mount bracket 45 for the power cylinder when the piston within the cylinder is in its retracted position. This causes the shoe to swing out away from the table, overcoming the tension of the spring 69, which prevents excessive wear of the leading edge of the shoe and also prevents wear on the table which would otherwise be the case if the spring were constantly effective to press the shoe inwardly. As may be seen in FIGURE 9 one end of the coil spring 69 includes an extension which is hooked around a pin 71 carried by the shoe. The opposite end is hooked around a projection 72 at the side of the guide arm 60 which keeps the spring 69 under tension. If desired, the bell crank 70 may be made as a separate piece, in which event an upper portion, beyond the pivotal mount on bushing 64 is positioned to contact the shoe and thus force it away from the table when the piston is in its retracted position.

The two ends of the pivot pin 36 project beyond the outer faces of the yoke arms 20—20 and they are grooved to receive hooks 73—73 which are at the upper ends of two elongated, heavy coil springs 74—74, these hooks serving to retain the pin in place. Hooks 75—75 at the lower ends of these springs are engaged in apertures 76—76 formed in the downwardly turned flanged ends of brackets 77—77 which are mounted on the underside of the lower mount bracket 46 for power cylinder 39. The two coil springs 74—74 tend to pull the piston rod, and thus the lower bead breaking shoe, down into a retracting position with respect to the power cylinder, and thus the piston works against the tension of these springs, which smooths out the operation of the shoe.

The upper bead breaker assembly 38 is rigidly secured to the upper end of column 37 by means of a mount bracket 78. This bracket projects up away from its attachment to the column at approximately 45 degrees. The end of the bracket at the column is configurated to provide an arcuate seat which embraces the column and which is secured to it by means such as welding. As will be best understood from FIGURES 1, 2 and 5 the main body 79 of the mount bracket 78 which preferably is of cast construction, is plate-like and it is strengthened and rigidified by means of a web 80 which extends along its upper edge such that the bracket is generally T-shaped in cross section. The upper end of the cast mount bracket is configurated to provide a boss 81 which is as wide as the web 80 and which has a bore through it to receive a pivot pin 82 upon which the upper bead breaking shoe itself, designated generally by the numeral 83, is pivotally mounted. The shoe, as in the case of the lower bead breaker shoe, includes two arms 84—84 which are disposed in spaced parallel relation, and the upper ends of these arms are drilled to provide holes through which the opposite ends of pin 82 project. Outside of each of the arms 84—84, pin 82 is grooved and snap rings 85—85 are employed to hold the pin in place. The two arms 84—84 curve downwardly and then inwardly toward the table away from the axis of pin 82, and as in the case of the lower bead breaker shoe, the upper shoe includes a wedge portion 86 which terminates in a thin leading edge, and two wing portions 87—87 which project from the sides of the wedged portion but which are set back with respect to the leading edge of the shoe which is at the tip of the wedge portion. In this case, the two wings and the wedge portion are also generally arcuate in shape but with the wings now being above the wedge. It is found that a spring such as the one indicated at 69, employed to urge the lower bead breaker shoe in toward the table, is not required for the upper shoe. Instead, it is preferred that an elongated handle 88 be employed which handle is attached directly to the backside of the shoe as by welding. As shown in FIGURES 1 and 2 the handle is forked to pass along both sides of the column with the ends of the fork attached to the arms 84—84. The opposite end of the handle has a grip 89 and downward pressure by the operator on the grip causes the shoe to swing in toward a wheel placed upon the table. The handle therefore provides a means of initially positioning the shoe so that its leading edge is presented to the juncture between the bead of the tire and the rim of the wheel prior to the application of air pressure to power cylinder 39. Thus initially presented, since the leading edge of the shoe is removed substantially in toward the wheel ahead of the axis of pivot pin 82, the shoe tracks upon the inner contour of the wheel just as in the case of the lower bead breaking shoe.

The upper bead breaking assembly also includes a clamp which is designated generally 90. The clamp 90 has a jaw 91 at its outer end. This jaw is configured to engage the outside of the turned over rim of an automobile wheel. In order to clear the edge of the rim the underside of the clamp is recessed as at 92 adjacent to the jaw. Preferably, the clamp is cast and its outer end adjacent to the jaw is solid, which adds some weight to its outer end. A handle 93 is attached to the upper side of the clamp in this area, the handle consisting of a knob and a shank, the shank being threaded at both ends with one end being engaged in an appropriately threaded bore in the upper side of the clamp and the other end being engaged in an appropriately threaded socket within the knob. The rearward portion of the clamp is bifurcated to provide two arms 94—94. These arms are angulated as viewed from the side as shown in FIGURE 5 so that they are substantially L-shaped, however, the angle between the sides of the L is slightly greater than 90 degrees as shown. Where the two parts of the L meet, an abutment 95 is provided on each arm. The two arms reside at the sides of the plate-like body portion 79 of the mount bracket such that the two abutments 95—95 are in positions to engage the underside of the web 80 which extends along the top of the mount bracket 78. Thus, the upward movement of the jaw relative to the mount bracket is limited. The ends of the L-shaped arms of the clamp opposite to the jaw have bores in them to receive a pivot pin 96, which pin extends through a bore in the body portion 79 of the mount bracket. Here again, the outer ends of the pivot pin are grooved to receive snap rings 97—97 to hold the pin in place. As shown, the clamp extends from the pivot pin between the arms 83—83 of the upper bead breaker shoe 84 and over top of the wedge and winged portions of the shoe. A stop bar 98 is mounted on the upper bead breaker shoe above the clamp 90. The opposite ends of bar 98 are welded to the arms 84—84 of the shoe, the bar being positioned so that it contacts bracket 80 when the handle is raised to the horizontal position thereby holding the handle horizontal when it is used to lift the column in the initial positioning of the apparatus.

The upper bead breaker shoe assembly also includes a pair of lift dogs 99—99 which are pivotally mounted by means of pins 100—100 upon the lower ends of the arms of the shoe just outside of each arm above the wedge and wing parts of the shoe. These lift dogs are utilized only when a safety rim of the type having a squared hump 101 is being operated upon. The dogs are so positioned that when they are swung into the operating position shown in FIGURES 7 and 8 they make contact with the rim of the wheel and lift the leading edge of the shoe over the hump. As shown in FIGURE 8 the side of the squared hump 101 toward which the upper bead breaking shoe moves in the initial break of the bead of a tire upon this type wheel is so perpendicular that the leading edge of the shoe might possibly become caught on it and prevented from moving past it in toward the drop center. As shown in FIGURE 7, the dogs are so related to the leading edge of the shoe that they do not make contact with the rim of the wheel until the leading edge of the shoe is sufficiently far into the juncture between the bead and the rim of the wheel to make the initial break. Thereafter, with the leading edge of the shoe in solid contact with the side of the bead the dogs cam the shoe out away from the hump, lifting the leading edge over the hump and permitting the shoe to push the bead on into the drop center past the hump. As suggested previously the dogs are not necessary on the majority of wheels such as the one shown in FIGURE 6 wherein a rounded hump 102 is employed.

The pneumatic valve to operate the power bead breaker apparatus is housed within the cap 41 at the top of column 37 and it is controlled by means of the handle 43. The details of the valve may best be understood from a consideration of FIGURES 10, 11 and 12 and from FIGURE 14 which shows the pneumatic system diagrammatically. The valve comprises a base 103. This base is generally cylindrical and of a diameter to fit down into the inside of the column 37, as shown. The upper surface of the base is planar and is given a smooth finish. The inside of the cap is counter-bored to fit down over the top of the upper portion of base 103, the counter-boring providing a shoulder 104 against which the top of the base resides. The base and cap are locked together by means of an expansible, split ring 105 which engages in mating grooves, one being at the inside of the counter bore within the cap and the other being within the upper portion of base 103. The cap is open at one side, as indicated at 106, to provide access to the split ring. Following conventional practices the ends of the split ring are turned down (not shown) so that means such as a pair of pliers may be inserted into the opening 106 to manipulate the split ring both in the assembly and disassembly of the valve.

The juncture between the base 103 and the inside of the cap is sealed by means of an O-ring 107. A valve plate 108 which is inside of cap 41 rests upon the planar upper surface of base 103. The lower face of the valve plate is planar and also given a smooth finish so that the two, the valve plate and the base, are substantially air tight when their two finished surfaces are pressed together. The valve plate may be turned through 90 degrees by means of handle 43. As may be seen in FIGURE 11 the handle fits down over top of the knurled upper end 109 of a stem 110. The lower end of this stem has a slot in it which receives a key 111 formed as an integral part of the valve plate 108 so that when the stem is turned the plate turns. The stem is held in place by means of a split ring 112 which resides within a groove located just to the underside of a boss which is located at the top center of the cap and which has a hole in it through which the stem projects. An O-ring seals the stem with respect to the boss, as shown. An anti-friction washer 113 is provided between the underside of the boss and the split ring 112. Additionally, a coil spring 114 is disposed, surrounding the lower end of stem 110, under compression between the upper surface of the valve plate and the underside of split ring 112. This spring, therefore, presses the valve plate 108 down into sealing engagement with the upper surface of base 103. If desired, a sleeve may be employed around the lower end of the stem to protect spring 114 as shown in FIGURE 11.

The 90 degree turning movement of the handle is defined by two stops 115 and 116. When the handle is in the "Off" position as indicated by the legends and the pointer shown in FIGURE 10, the handle rests against stop 115. When the handle is moved into the centered position with respect to the two stops 115—116 a latch, indicated generally by the numeral 117, comes into contact with a safety stop 118. The safety stop and the two stops 115 and 116 may be cast as integral parts of the top of cap 41. Latch 117 is mounted inside of the handle and it comprises a pivoted lever which rocks about a cross pin 119. The inner end of the latch is biased downwardly by means of a coil spring 120 to ride upon the upper surface of cap 41 and therefore to come into contact with the stop 118 when the handle is moved from its "Off" position against stop 115 into the centered position shown in FIGURE 10. To release the latch it is necessary to depress the thumb piece 121 which projects up through an opening in the handle adjacent to the knob 122 which is at the outer end of the handle. Thus, it takes a conscious effort on the part of the operator to move the handle from the centered position of FIGURE 10 over into engagement with the stop 116.

Referring now to FIGURE 12, valve plate 108 roughly is semi-circular and its underside has an arcuate groove 123 in it which extends approximately 180 degrees around the central axis of the valve plate. The two ends of this groove are rounded as shown. FIGURE 12 shows the position of the valve plate when the valve is in the "Off" position. In this position, the groove 123 is open to air pressure from an air supply hose 124 through an inlet passageway 125 which extends through base 103. There are three other passageways through the base plate 103. One of these designated 126 is in communication with the wheel clamp power cylinder 18 by means of a connector hose 127. The second one of these passageways designated 128 is in communication with bead breaker power cylinder 39 by means of a hose 129. The third passageway is simply open to the atmosphere inside of column 37 and it constitutes an exhaust port 130. The three hoses 124, 127 and 129 pass up through the hollow interior of column 37 and each has a connector 131 (only one of which is shown) which threads into the base 103 axially of the passageway which it serves. A hose clamp such as the one designated 132 may be employed at the base of the column to prevent the hoses from becoming entangled. Connectors similar to the one shown at 131 are employed at the opposite ends of hoses 127 and 129 to connect them to their respective power cylinders.

As may be seen from FIGURE 12, when the handle is in the "Off" position, as indicated by the printed legends and by the dot-dash lines on this figure, the air pressure from the supply hose is open into the groove 123 through passageway 125. However, inasmuch as there is no exit for the groove while it is in this position the chamber provided by the groove 123 is simply pressurized and nothing is actuated. When the handle is swung into its central position, and this may be done without operating latch 117, the groove is shifted so that now passageways 125 and 126 are in communication with one another. Thus, air pressure is directed through hose 127 to the wheel clamp power cylinder 18. As explained and shown in U.S. Patent No. 2,808,860 this has the effect of pulling down on the center post and clamping a wheel to the table. When the latch 117 is released, the handle may be swung into the third position shown in FIGURE 12, and now air under pressure is directed through hose 129 to the bead breaking power cylinder 39. It is to be noted that the pressure is maintained in the hose 127 to the wheel clamp power cylinder 18 while this takes place and it is not until the valve plate is returned to the "Off" position shown in FIGURE 12 that pressure is released from the wheel clamp power cylinder 18.

The hand operated bead breaker of Henderson Patent No. 2,609,039 is adapted to be moved around a tire mounted upon the machine to progressively break the bead at different points around the circumference of the wheel. This is also done in the bead breaker shown here. However, it is found that it is not necessary to break the bead at all points entirely around the wheel because of the winged breaker shoe disclosed here. Hence, it is not necessary that the power bead breaker assembly be rotatable completely around the table, and by providing a stop 133 on the pedestal to limit the movement of the breaker assembly to approximately 300 degrees, no problem is encountered in entangling the air hoses at the base of the machine. The stop 133 is engageable by the vertical stop plate 26 which joins the two split bearings 24 and 25.

When the machine is not in use, the yoke 19 which mounts the power breaker assembly is in the position shown in FIGURE 1, in which position the juncture of the crossed truss members 21 rests upon a step 134 which is provided in the outer edge of stop plate 26. This prevents the breaker assembly from swinging on down and into contact with the legs of the machine. Also in this position the column 37 is positioned so that the stop 53 rests against the upper rim of the cylindrical sleeve 44. As shown in FIGURE 1, the column is in an elevated position with respect to this sleeve which would not be the case with the machine at rest.

The vertical stop plate 26 also has a second step 135 cut into its outer edge, this step cooperating with a projection 136 which extends at approximately 45 degrees down from the upper mount bracket for power cylinder 39. The second step 135 is both a safety expedient and, as will be explained, it permits the lower bead breaker only to be employed if an operation of this type is desired. When the machine is in the position of rest shown in FIGURE 1 the projection 136 of upper mount bracket 45 is above but aligned with the step 135. If air is now directed into the power breaker cylinder 39, the column and the power cylinder, as will be explained, are forced down and might possibly come into contact with the toes of a workman if it were not for the safety stop provided by the shoulder.

*Operation*

To demount a tire, the wheel upon which the tire is mounted is first clamped onto the table. This is done by laying the wheel on the table and then placing the clamp 16 over the center post and engaging it in an appropriate one of the series of grooves 15. The operating handle 43 for the valve is then turned from the "Off" position to the centered "Lock Rim" position. This rotates valve plate 108 to direct air pressure from passageway 125 into air passageway 126. From this latter passageway the air is directed to the wheel clamp power cylinder 18 through hose 127. This has the effect of pulling the center post down and securely locking the wheel on the table underneath clamp 16.

The usual fifteen inch wheel and most sixteen inch wheels can be placed on the table with the outside of the wheel up. Some fourteen inch wheels must be placed with the outside of the wheel down. This is because in most of these wheels the drop center is offset with respect to the rims so that it is closer to the rim at the inside of the wheel then at the outside. Due to the shallow depth of the center well, the overall width of the wheel and the off-center relation of the well, the tire must be removed from the side of the wheel closer to the drop center, and in some fourteen inch wheels used presently this is the inside of the wheel.

The bead breaker assembly is then lifted and the column turned to present the jaw 91 of clamp 90 to the outside of the upper rim as shown in FIGURE 3. Both handles 88 and 93 may be grasped in the lifting operation. With the jaw of the clamp thus engaged, the lower bead breaker is in a position at the side of the table which aligns it with the juncture of the bead at the lower side of the tire and the adjacent rim of the wheel. At this time a downward pressure may be brought to bear upon handle 88 which also positions the upper bead breaker shoe so that it is aligned with the juncture of the bead at the upper side of the tire and the adjacent rim. The two dogs 99—99 should be flipped back into the inoperative positions shown in FIGURES 3 and 5 unless a safety wheel of the type having a square hump is being worked upon as has been explained previously. The operator may now depress the thumb latch 121 on handle 43 and apply air pressure to the bead breaker cylinder 39 by turning the handle past the safety stop 118. This rotates the valve plate 108 into a position such that the passageway 128 is in communication with the air supply inlet 125, and hence air pressure is supplied to power cylinder 39 through the connector hose 129. The application of air pressure to the power cylinder extends piston rod 57 and the extension of this rod both pushes up on the lower bead breaker shot 65 and pulls down on the column, the column in turn exerting a downward force upon the upper bead breaker shoe 83. As the two shoes move into the upper and lower junctures of the beads and rims, the leading edges of the two shoes track upon the inner contour of the wheel first breaking the beads loose and then prying them into the drop center of the wheel. With the first break established the operator then may return the handle 43 to the center position, which maintains pressure in the wheel clamp cylinder 18, but which exhausts the hose 129 of the breaker cylinder 39 by bringing passageway 128 into communication with exhaust port 130. The heavy springs 74—74 at the sides of the breaker cylinder then cause the piston rod 57 to retract which withdraws the lower bead breaker and permits the entire breaker assembly to be rotated around pedestal 11 to a new location where the breaker operation is repeated. This is done in several locations around the wheel as required until the tire is completely free of the rims.

At this time the lower bead breaker only may be employed to hold one side of the tire up so that its lower bead remains in the drop center, thereby assisting in the removal of the tire. In this case the upper bead breaker is swung out of the way and when air is supplied to the breaker power cylinder the lower bead breaker shoe moves up to elevate the tire and hold it in the drop center. In doing this, the projection 136 comes down and into contact with the lower step 135 on stop plate 26. Once this contact is made, the piston rod pushes up on the breaker shoe. The tire then may be removed following known techniques.

The breaker mechanism of this invention may be used to operate upon substantially all known wheels, including unusually wide ones as well as the small wheels, usually twelve or thirteen inches in diameter employed upon foreign automobiles. While operating upon the popular wheels, such as fourteen and fifteen inch wheels, it is found expedient to limit the upward movement of the lower bead breaker so that it does not push the lower bead so far into the drop center well as to cause pinching. The limit is provided by means of an adjustable stop 137 which stop is pivotally mounted on a pin 138 extending between two arms 139—139 which project in toward the pedestal from the inverted cap portion 61 of guide arm 60. The stop is in such a position that it comes into contact with the underside of table 12 as shown in FIGURE 5. When a greater throw to the lower bead breaker shoe is required, the stop 137 is flipped over into the inoperative position shown by the dot-dash lines at 140, and this permits the lower bead breaker shoe to travel farther and thus accommodate wide rims and also accommodate small wheels.

Having described our invention, we claim:

1. Power operated tire demounting apparatus for a tire changing machine of the type having a circular table and means to clamp a wheel onto the table, said apparatus comprising an elongated column, a mount bracket affixed to the upper end of said column, an upper bead breaker shoe, means pivotally mounting said upper bead breaker shoe on said mount bracket for swinging movement in a plane which is common to the longitudinal axis of the column, a power cylinder including an extensible and retractable piston rod, means connecting said power cylinder to the lower end of said column so that the axis of the piston is in spaced parallel relation to the column, a lower bead breaker shoe, means pivotally connecting said lower bead breaking shoe to the upper end of said piston rod for swinging movement in a plane which is common to the longitudinal axis of the column, said means connecting said power cylinder to the lower end of the column including a rotatable journal which permits the column to be turned from a position in which the upper bead breaker shoe is directly above the lower bead breaker shoe to a position in which the upper bead breaker shoe is to one side of said position directly above the lower bead breaker shoe, and means mounting said power operated tire demounting apparatus at the side of the table with the longitudinal axis of the column in a vertical plane common to the vertical central axis of the table, the last named means including means to permit the column to be moved circumferentially of the table.

2. Power operated tire demounting apparatus for a tire changing machine of the type having a circular table and means to clamp a wheel onto said table, said apparatus comprising an elongated column, an upper bead breaker shoe, means fastening said upper bead breaker shoe to the upper end of the column, a power cylinder including an extensible and retractable piston rod, means connecting said power cylinder to the lower end of said column so that the axis of the piston is in spaced parallel relation to the column, a lower bead breaker shoe, means connecting said lower bead breaker shoe to the upper end of said piston rod, the means connecting the power cylinder to the lower end of the column including a rotatable journal which permits the column to be turned from a position in which the upper bead breaker shoe is directly above the lower bead breaker shoe to a position in which the upper bead breaker shoe is to one side of said position directly above the lower bead breaker shoe, and means mounting said power operated tire demounting apparatus at the side of the table with the longitudinal axis of the column in a vertical plane common to the vertical central axis of the table.

3. Power operated tire demounting apparatus for a tire changing machine of the type having a circular table and means to clamp a wheel onto the table, said apparatus comprising an elongated column, means fastening an upper bead breaker shoe to the upper end of said column, a power cylinder including an extensible and retractable piston rod, means connecting said power cylinder to the lower end of said column so that the axis of the piston is in spaced parallel relation to the column, a lower bead breaker shoe, means connecting said lower bead breaker shoe to the upper end of said piston rod, whereby application of air pressure to said power cylinder to extend the piston rod with respect to the cylinder causes the two bead breaker shoes to move toward one another, a yoke, means mounting said yoke beneath the table with one end thereof projecting beyond the table, the last named means including a pivot to provide said one end of the yoke limited up and down movement, and pivot means connecting the said one end of said yoke to the upper end of said piston to provide limited rocking movement toward and from the table for the column in a vertical plane common to the vertical central axis of the table.

4. Power operated tire demounting apparatus as set forth in claim 3 in which means are provided to permit the upper bead breaker shoe to be swung between a first position in which said upper bead breaker shoe is aligned with said lower bead breaker shoe to a position which is to the side of said first position.

5. Power operated tire demounting apparatus for a tire changing machine of the type having a circular table and means to clamp a wheel onto the table, said apparatus comprising an elongated column, means fastening an upper bead breaker shoe adjacent to the upper end of said column, a lower bead breaker shoe, means connecting said lower bead breaker shoe to the lower end of said column, said bead breaker shoes normally being aligned with one another longitudinally of the column, the lower end of said column being turnably connected to said lower bead breaker shoe to swing in an arc to a side position in which it is out of alignment with the lower bead breaker shoe, the means connecting said lower bead breaker shoe to the lower end of the column including a power cylinder having an extensible piston rod adapted, upon actuation thereof, to force the lower bead breaker shoe upwardly while forcing the column and the upper bead breaker shoe fastened thereto downwardly, and pivot means mounting said power operated tire demounting apparatus at the side of the table for limited rocking movement in which the longitudinal axis of the column remains in a vertical plane common to the vertical central axis of the table.

6. Power operated tire demounting apparatus for a tire changing machine of the type having a circular table and means to clamp a wheel upon the table, said apparatus comprising a yoke, means mounting said yoke beneath said table for rotation about the vertical central axis thereof and for limited up and down swinging movement of the outer end thereof in a vertical plane common to said vertical central axis, a power cylinder including an extensible piston rod, means pivotally connecting the outer end of said piston rod to the outer end of said yoke for swinging movement therewith, spring means interconnecting the power cylinder and the outer end of the yoke and normally urging the air cylinder toward the yoke to retract the piston rod with respect to the power cylinder, a column, means connecting the lower end of said column to said power cylinder with the column disposed in a plane common to the central axis of said stand and extending above the table, a lower bead breaker shoe pivotally connected to the upper end of said piston, an upper bead breaker shoe, means pivotally connecting said upper bead breaking shoe to the upper end of the column, whereby application of air pressure to the power cylinder causes the piston to extend with respect to the air cylinder and thereby force the lower bead breaker shoe up and at the same time force the power cylinder down, the downward movement of the air cylinder causing the column to move down and thereby move the upper bead breaker shoe down.

7. Power operated tire demounting apparatus for a tire changing machine of the type having a circular table and means to clamp a wheel onto said table, said apparatus comprising an elongated column, means mounting said column at the side of the table for restricted movement in which the longitudinal axis of the column remains in a plane which is common to the vertical central axis of said table, an upper bead breaker shoe, means connecting said upper bead breaker shoe to the upper end of said column, a power cylinder including an extensible and retractable piston rod, means mounting said power cylinder beneath the table so that the axis of the piston is in the plane which is common to the longitudinal axis of the column and the vertical central axis of the table, a lower bead breaker shoe, means connecting said lower bead breaker shoe to the piston rod of the power cylinder, said lower bead breaker shoe being at a side of the table and below the upper surface thereof when the piston is retracted but movable into a raised position in which it is above the table and inside of the outer periphery thereof when the piston rod is extended, means interconnecting the column and the power cylinder whereby the column may be forced down and thereby move the upper bead breaker shoe down, the upper bead breaker shoe being pivoted with respect to the column whereby it may swing in toward the table during such downward movement, and said means interconnecting the column and the power cylinder including means to provide movement of the upper bead breaker shoe between a first operative position in which the bead breaker shoe is between the column and the vertical central axis of the table and a second inoperative position in which the upper bead breaker shoe is removed at least 90 degrees from said first position, whereby the lower bead breaker shoe may be used without the upper bead breaker shoe.

8. Power operated tire demounting apparatus for a tire changing machine of the type having a circular table and means to clamp a wheel onto said table, said apparatus comprising an elongated column, means mounting said column at the side of the table for restricted movement in which the longitudinal axis of the column remains in a plane which is common to the vertical central axis of said table, an upper bead breaker shoe, means connecting said upper bead breaker shoe to the upper end of said column, a power cylinder including an extensible and retractable piston rod, a lower bead breaker shoe, means connecting said lower bead breaker shoe to the piston rod of the power cylinder for operation thereby, means interconnecting the column and the power cylinder to move the column and thereby operate the upper bead breaker shoe, and said means interconnecting the column and the power cylinder including means to provide movement of the column about its own axis to move the upper bead breaker shoe from an operative position in which it is between the column and the table to an inoperative position in which the upper bead breaker shoe is removed at least 90 degrees to the side of the first-mentioned position, whereby the lower bead breaker shoe may be used without the upper bead breaker shoe.

9. Power operated tire demounting apparatus for a tire changing machine of the type having a stand with a circular table and means to clamp onto the table a wheel having a tire thereon, said apparatus comprising an elongated column the lower end of which is below the table and the upper end of which is above the table, means movably connecting said column to the stand at the side of the table for limited rocking movement in which the longitudinal axis of the column remains in a plane which is common to the vertical central axis of said table, an upper bead breaker shoe, means connecting the upper bead breaker shoe to the upper end of said column, a lower bead breaker shoe, means movably mounting said lower bead breaker shoe adjacent to the periphery of said table with said lower bead breaker shoe normally being disposed below the upper surface of said table and between the table and said column, an air cylinder disposed beneath the table between the vertical central axis of the table and the column, means interconnecting said air cylinder and said column, an extensible piston rod associated with said air cylinder and projecting upwardly therefrom, means connecting said piston rod to the lower bead breaker shoe, whereby upon application of air pressure to the cylinder to extend said piston rod the lower bead breaker shoe is moved in a generally upward direction, and whereby resistance to such upward movement reacts upon the means connecting said air cylinder and said column to move the column in a generally downward direction to thereby move the upper bead breaker shoe down, the air cylinder and piston rod being so related to the table that the upward movement of the piston rod carries the lower bead breaker shoe up to a position in which it is above the table, and the means interconnecting said air cylinder and said column including means to provide rotative movement of the column about its own axis to permit the upper bead breaker shoe to be swung from an operative position in which it is between the upper end of the column and the table to an inoperative position in which it is at the side of the column, whereby the lower bead breaker shoe may be used alone.

10. Power operated tire demounting apparatus for a tire changing machine of the type having a stand with a circular table and means to clamp onto the table a wheel having a tire thereon, said apparatus comprising an elongated column, means movably connecting said column to the stand at a side of said table, a lower bead breaker shoe, means movably mounting said lower bead breaker shoe adjacent to the periphery of said table with the shoe normally being disposed below the upper surface of said table, an upper bead breaker shoe, means connecting said upper bead breaker shoe to the upper end of said column, an air cylinder disposed below the table, means interconnecting said air cylinder and said column, an extensible piston rod associated with said air cylinder and projecting upwardly therefrom, means connecting said piston rod to said lower bead breaker shoe, whereby upon the application of air pressure to the cylinder to extend said piston rod, the lower bead breaker shoe is moved in a generally upward direction, and whereby resistance to such upward movement reacts on the means interconnecting said air cylinder and said column to move said column in a generally downward direction to thereby move the upper bead breaker shoe down, and the means interconnecting said air cylinder and said column including means to provide rotative movement of the column about its own axis to permit the upper bead breaker shoe to be swung from an operative position in which it is between the upper end of the column and the table to an inoperative position in which it is at the side of the column, whereby the lower bead breaker shoe may be used alone.

References Cited in the file of this patent

UNITED STATES PATENTS

| | | |
|---|---|---|
| 2,439,135 | Johnson et al. | Apr. 6, 1948 |
| 2,470,534 | Thomas | May 17, 1949 |
| 2,511,743 | Smith | June 13, 1950 |
| 2,616,487 | Parks | Nov. 4, 1952 |
| 2,808,860 | Hildebrant | Oct. 8, 1957 |
| 2,812,805 | Athmann | Nov. 12, 1957 |
| 2,825,395 | Twiford | Mar. 4, 1958 |
| 2,892,491 | Twiford | June 30, 1959 |